United States Patent Office 3,544,878
Patented Dec. 1, 1970

3,544,878
ARRANGEMENT FOR CHARGING AN ACCUMULATOR BATTERY
Tadeusz Wolpert, Bandhagen, and Leif Tage Hansson, Alvsjo, Sweden, assignors to Telefonaktiebolaget L M Ericsson, Stockholm, Sweden, a corporation of Sweden
Filed June 11, 1968, Ser. No. 736,230
Claims priority, application Sweden, June 30, 1967, 9,927/67
Int. Cl. H02j 9/00
U.S. Cl. 320—39
2 Claims

ABSTRACT OF THE DISCLOSURE

An arrangement for charging an accumulator battery, in which arrangement an amplistat is used as a device for measuring the current in the charging circuit for the battery, and to connect or disconnect a charging voltage in dependence on the value of the current in the charging circuit.

---

The present invention relates to an arrangement for charging an accumulator battery, particularly a battery for a telephone exchange.

Various arrangements for charging accumulator batteries are known. These known arrangements are however not suitable, if one continuously wants to supervise the charged condition of an accumulator battery or to start automatically the recharging to 100% or to interrupt the recharging, while simultaneously feeding a telephone exchange from the same power equipment.

An object of the invention is that the equipment should also be able to carry out the above mentioned functions by using a very sensitive current sensing device in the battery circuit which can react to a very small change of the charging current, for example a few milliamperes of the nominal current.

An arrangement according to the invention is characterized in that it comprises a transducer, supplied by the current of the accumulator battery and having a current depending output voltage characteristic with three sections. The middle section is a relatively steep section and two other sections have a substantially lower slope. A relay which is operated by the output voltage of the transducer connects the accumulator battery to a first charging voltage source when the relay is in an operated state and connects the accumulator battery to a second charging voltage source, having a lower value than said first charging voltage, when the relay is in a released state. The transducer has two control windings, a first of which is connected in series with accumulator battery to charging voltage source, and the second of which controls the premagnetization current of the transducer, so as to maintain the steep section of the output voltage characteristic between two required charging current values, to control operation and release respectively, of the relay upon a small increase and decrease, respectively, of the charging current.

Figure 1:
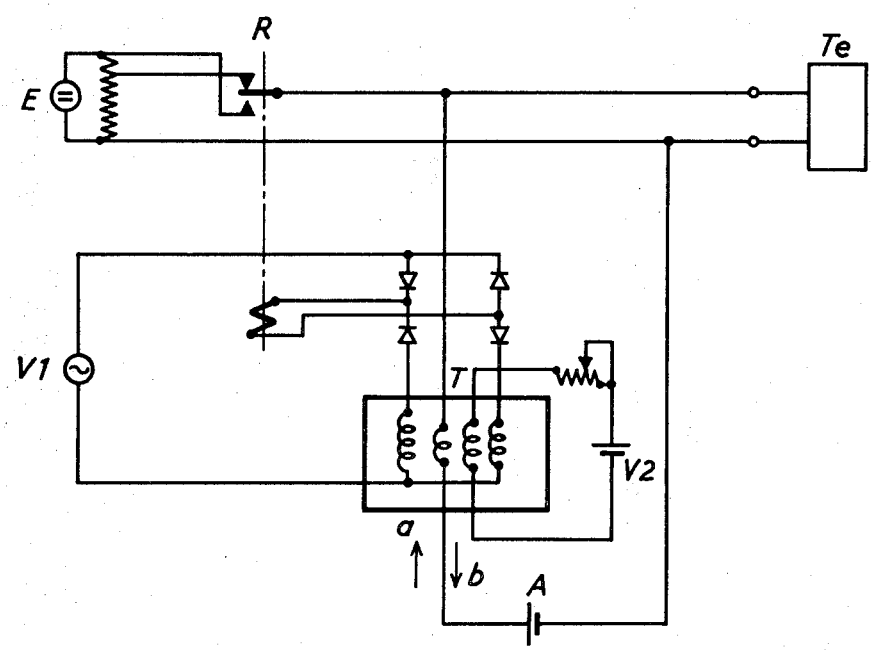

An example in accordance with the invention will now be described with reference to the accompanying drawing. FIG. 1 shows the invention applied to a circuit comprising an accumulator battery, FIG. 2 shows the output voltage of the arrangement as a function of the total ampere-turns and FIG. 3 shows the relation between the cell voltage of an accumulator battery as a function of the charging current with the charged condition of the battery as a parameter.

FIG. 1 shows the invention applied to a charging circuit for a telephone exchange. The arrangement supervises the charging of an accumulator battery A, connected to a telephone exchange Te, being fed from a direct voltage source E, and to the direct voltage source. By means of the contacts of a relay R, the direct voltage source can be set either to a normal voltage intended only for the feeding of the telephone exchange Te, or to a higher voltage intended for the charging of the accumulator battery, at the same time as the telephone exchange is powered. The relay R is connected to a transducer T, having two operating windings connected in parallel and two control windings, one of the control windings carrying the current of the accumulator battery and the other control winding carrying a premagnetization current, that can be set to a desired value. One end of each of the operating windings is connected to one of the terminals of an alternating current source VI, the other end of each winding is connected to the other terminal of alternating current source VI via its own series branch consisting of two rectifiers. The winding of the relay R is connected to the junctions of the two rectifiers of the respective series branches. Hereby the output voltage of the transducer will determine the current through the relay winding.

Figure 2:
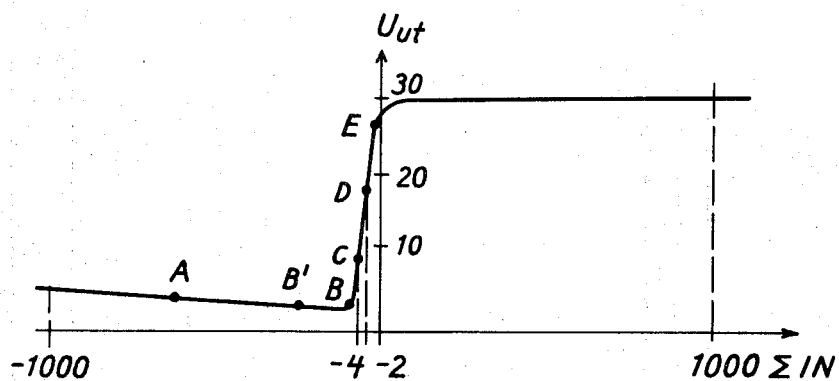
Figure 3:
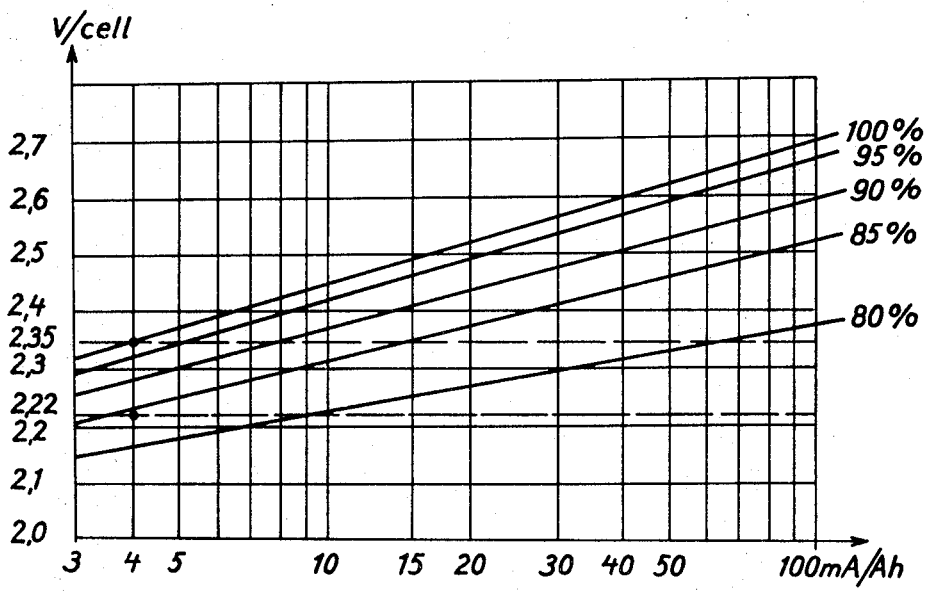

In FIG. 2 the output voltage of the transducer is shown as a function of the total number of ampere-turns of the control windings. By letting the control winding, carrying the current of the accumulator battery, have a very large cross section, the number of ampere-turns of the winding can be allowed to be very large, for example 1000 ampere-turns. By a suitable setting of the premagnetization current, the operating point of the transducer can be set within the steep part of the magnetization curve, the steep part for example being within 2 ampere-turns. In FIG. 2 a number of operating points are indicated. The point A denotes a point on the part of the curve corresponding to the discharge of the battery. The current direction is indicated in FIG. 1 by means of the arrow $a$. The point B denotes the point, in which the current direction changes to the direction of the arrow $b$, depending on the fact that the voltage of the battery has become lower than the voltage of the voltage source, whereby the output voltage of the transducer starts to rise steeply. By changing the premagnetization current it is possible to shift from the point B to the point B', the point, where the current in the battery circuit changes its direction. The point E denotes the operating point, at which the transducer, as a result of the continuing current increase, will be saturated. The output voltage at that point shifts constant value.

When the charged condition of the accumulator battery has dropped so low that a charging current begins to flow in the control winding connected to the battery in the direction of the arrow $b$ in FIG. 1, the operating point is shifted on the steep part of the curve in FIG. 2. The relay is dimensioned so that it operates when the value of the output voltage reaches point D, whereby the charging voltage is increased. During the charging of the accumulator battery, the charging current drops and the relay releases, when the value of the output voltage of the transducer reaches point C, whereby a changing-over to the lower voltage takes place.

FIG. 3 is a diagram showing the relation between the cell voltage and the charging current as a function of the charged condition of the battery in percent of a fully charged condition. Moreover, there is shown the voltage 2.22 v. across an accumulator cell in the released state of the relay R as well as the voltage 2.35 v. across an accumulator cell in the operated state of the relay R. It is assumed that the arrangement is adjusted in such a way that the relay R operates when the charging current to the battery is for example 4 ma./a.h. This implies, according to the diagram, that when the charging current from the voltage source to the battery begins to increase, as a result of the discharge of the battery, and finally reaches 4 ma./a.h., which according to the example occurs at a charged condition of 84%, the relay will operate, so that the source voltage is increased to 2.35 v./cell. In consequence of the voltage increase, the operating point is instantly shifted along the line for a charged condition of 84% to approximately 17 ma./a.h. After that, the charged condition increases and the operating point is shifted along the line corresponding to a cell voltage of 2.35 v. When the charged condition reaches 100%, the charging current drops below 4 ma./a.h. and the relay releases, whereby the voltage of the voltage source is lowered to 2.22 v./cell. As a result of this, the operating point is shifted to the left, to a point outside the diagram, where a very small charging current flows in the direction $b$ in FIG. 1. When the battery again is somewhat discharged, the current from the voltage source increases in the direction indicated by $b$. When the current in consequence of the continuing discharge has increased to 4 ma./a.h., the relay again operates and the previously described process is repeated.

The invention makes possible the periodic supervision of a battery. It may happen, that the charged condition of the battery is somewhat above 84% at the beginning of a low-load time but still not low enough to operate the relay and increase the charging voltage. The charged condition may for example have reached 85%, which, according to the diagram, does not cause operation of the relay and consequently no increase of the cell voltage to 2.35 v. The result is, that the battery is not charged during low-load time. In order to avoid this, it is possible to increase the cell voltage periodically for a short time, for example once every 24 hours at the begining of the low-load time. Now if the charged condition is below 100%, the relay is kept operated and the charging continues with the increased voltage until a 100% charged condition has been reached.

On the other hand it may happen, that the battery at the end of the low-load time has a charged condition of almost 100%, but the relay has not yet released. This would cause the whole equipment to operate with an increased voltage and, consequently, with higher current consumption, in spite of the fact that the charged condition of the battery would allow a decrease of the charging voltage. Contrary to the previous case, the voltage is now decreased for a short time before the beginning of the high-load time to 2.22 v. Now if the charged condition has been higher than 84%, the charging current will remain below 4 ma./a.h. and the relay will release and remain released so that the charging continues at the lower voltage.

We claim:
1. Apparatus for charging a battery comprising a charging voltage means having first and second outputs, said first output having a charging voltage that is higher than the charging voltage of said second output, a relay having a voltage sensitive operating winding, a movable contact and first and second fixed contacts connected to the first and second outputs, respectively, of said charging voltage means, said movable contact being connected to said first fixed contact when said relay is operated and being connected to said second fixed contact when said relay is released, a transducer means having a voltage output means connected to the voltage sensitive operating winding of said relay and first and second control windings, said transducer having an output voltage characteristic which is dependent on the current flowing through said control windings, said characteristic having a form which is divided into three adjacent portions wherein the center portions have a relatively steep slope and each of the outer portions has a relatively gradual slope, means for connecting said first control winding in series with said battery and the movable contact of said relay, and means for applying a premagnetizing current to the second control winding of said transducer, said premagnetizing current having such a value to maintain the operating point of said transducer on the relatively steep slope portion of the characteristic.

2. The apparatus of claim 1 wherein the voltage output means of said transducer means comprises four diodes and a source of alternating current, means for connecting the anode of a first of said diodes and the cathode of a second of said diodes to one terminal of said source of alternating current, means for connecting the cathode of said first diode to the cathode of a third of said diodes, means for connecting the anode of said second diode to the anode of a fourth of said diodes and first and second further windings connecting the anode of said third diode and the cathode of said fourth diode, respectively, to the other terminal of said source of alternating current, and the operating winding of said relay being connected across the junction of the cathodes of said first and third diodes and the junction of the anodes of said second and fourth diodes.

References Cited
UNITED STATES PATENTS

| | | | |
|---|---|---|---|
| 2,197,423 | 4/1940 | Agnew | 320—23 X |
| 2,423,134 | 7/1947 | Winkler | 320—39 |
| 2,621,316 | 12/1952 | Lamm et al. | 320—39 X |
| 2,660,702 | 11/1953 | Arvidsson | 320—39 X |
| 2,942,170 | 6/1960 | Torre et al. | 320—23 |
| 2,431,312 | 11/1947 | Cronvall | 320—22 |
| 2,967,988 | 1/1961 | Seright | 320—40 X |
| 3,081,426 | 3/1963 | Bakke | 320—39 X |

J D MILLER, Primary Examiner

J. M. GUNTHER, Assistant Examiner

U.S. Cl. X.R.

320—14, 32